Oct. 24, 1933.  F. BURKETT ET AL  1,931,527
BEER PIPE CLEANING APPARATUS
Filed Sept. 8, 1932
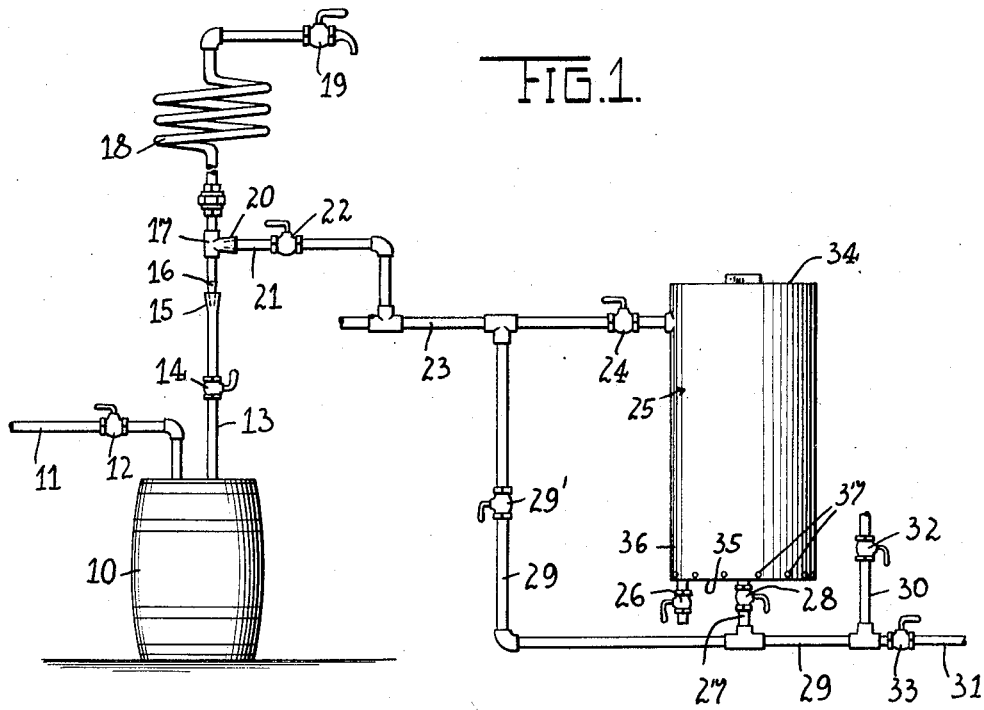
Fig. 1.
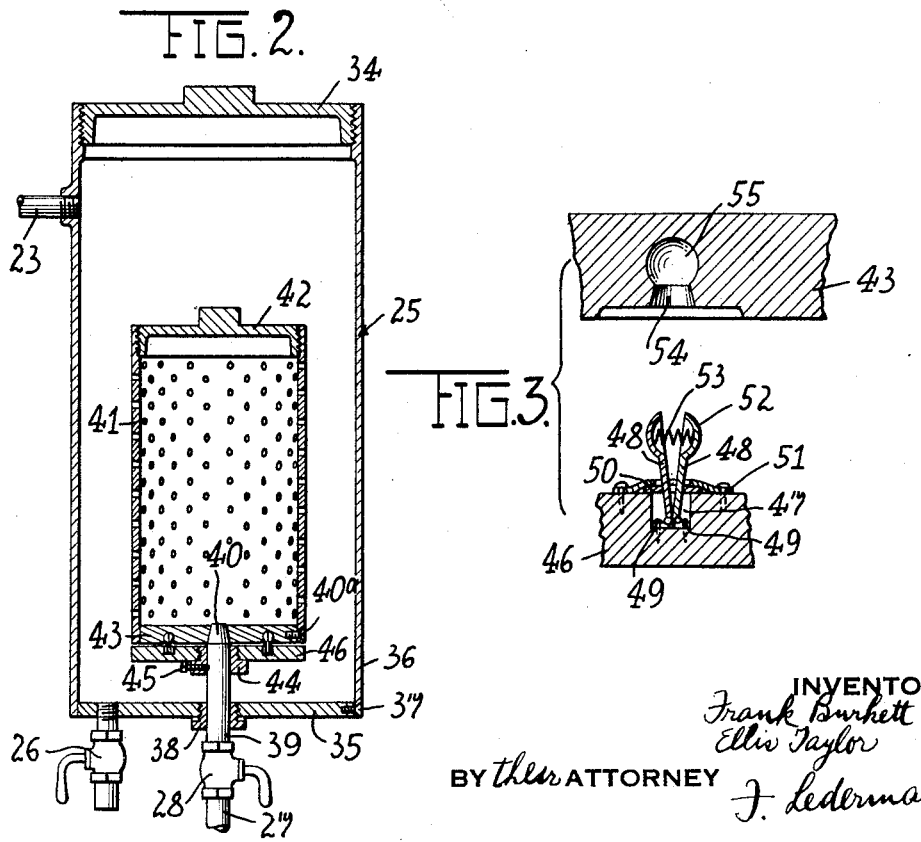
Fig. 2.
Fig. 3.
INVENTORS
Frank Burkett
Ellis Taylor
BY their ATTORNEY
J. Ledermann Patented Oct. 24, 1933

1,931,527

UNITED STATES PATENT OFFICE 1,931,527

BEER PIPE CLEANING APPARATUS

Frank Burkett and Ellis Taylor, Astoria, N. Y.

Application September 8, 1932. Serial No. 632,166

5 Claims. (Cl. 225—12)

One object of this invention is to provide a novel means for cleaning out the pipes leading to and from a barrel containing a beverage such as beer or the like, and the outlet tap for the same, which is usually located adjacent a counter or bar.

Another object of the invention is the provision of a novel mixing chamber adapted to be used in connection with the above for mixing a solution of cleaning powder such as soda, sodium carbonate, or the like.

A still further object of the invention is the provision of a novel mixing chamber as abovementioned so constructed that the container mounted therein to receive the chemical may be detached and removed from the mixing chamber in order to clean the container.

Another object of the invention is the provision of a novel construction for the above-mentioned container whereby the same may be readily removed or re-mounted in position without the use of any tools.

The above and other objects will become apparent in the description below, in which characters of reference refer to like-named parts in the drawing.

Referring briefly to the drawing, Figure 1 is a schematic representation of a beer pipe flushing system.

Figure 2 is a longitudinal cross-sectional view through the mixing cylinder.

Figure 3 represents enlarged details in crosssection of the chemical container.

Referring in detail to the drawing, the numeral 10 represents a barrel containing beverage such as beer into the top of which an air line 11 having a valve 12 therein enters. A beer pipe or hose 13 rises from the barrel 10 and is provided with a valve 14. On its upper end the pipe 13 is widened so that it may be coupled to the tapering tip 16 of a T coupling 17. From the coupling 17 the pipe 13 continues through the cooling coil 18 and terminates at a spigot or tap 19. The branch 20, of the coupling 17, is attached to a pipe 21 in which a valve 22 is located. This pipe 21 continues through a pipe 23 and a valve 24 into a mixing cylinder 25. The latter is provided with a drain valve 26 and an inlet valve 28 mounted in a pipe 27 which communicates through a pipe 29 with a water supply. A cold water pipe is indicated at 31 and is controlled by a valve 33; the hot water pipe is shown at 30 and is controlled by a valve 32. A by-pass between the water inlet pipe 27 and the pipe 23 is provided around the cylinder 25 by the pipe 29 having a valve 29' located therein.

The mixing device 25 comprises a bottom 35 and a cylindrical enclosing wall 36 having a removable cap 34 at its top threadably engaging the wall. At its bottom, the floor 35 of the chamber is secured to the wall 36 by means of screws 37 or the like. A central opening is provided in the bottom 35 of this cylinder, and a threaded bushing 38 is mounted in this opening. Through this bushing a tube 39 having its upper end 40 tapered, passes from the valve 28 into the chamber formed by the cylinder 36. Located within the said chamber and spacedapart from the cylinder 36, is a smaller perforated cylinder 40. The latter comprises a perforated cylindrical wall 41, but this cylindrical wall may also be formed of a screen-like material.

A removable cap 42 closes the top of the cylinder 40. The base of the cylinder 40 is shown at 43 and is united to the wall 41 by means of screws 40a or the like. A central opening is provided in the base 43 through which the tapering tube 40 of the inlet pipe 39 passes. A disk 46 is provided with a centrally engaging bushing 44 threadably engaging the disk and releasably locked on the inlet tube 39 by means of a set screw 45. The entire cylinder 40 may be separated from the disk 46 whenever desired for the purpose of cleaning out the cylinder 40, after it has been removed from the cylinder 36. To make this possible the following construction is provided: On either side of the center of the disk 46, recesses 47 are provided into which arms 48 extend downwardly. Each of these arms 48 is provided with a plate 49 screwed against the bottom of the recess 47, each arm 48 being hingedly attached to its plate 49. An inverted cup-like washer 50 is mounted about the recess 47 of the arms 48 projecting through the central opening in the washer. The periphery of this central opening limits the outward divergent movement of the arms 48 with respect to each other. A second washer 51, substantially similar to the washer 50, is mounted directly above the latter and secured to the disk by means of screws or the like. On the upper extremities of the arms 48, mutually opposing hemispherical cups 52 are mounted, and a coiled spring 53 having its ends secured to the inner sides of these cups normally urges the latter apart. At points a similar distance from the center, tapering recesses 54 are provided in the bottom 43 of the container 40. Directly above the recesses 54 spherical recesses 55 are provided. In inserting the container 40 on to the disk 46 the various arms 48 are vertically aligned with the recesses 54, whereupon the container 40 is forced down against the disk 46. The cup-like members 52 are thereupon forced toward each other by the tapering walls of the recess 54 until the cups enter the spherical recess 55, at which point the cups are urged apart by the spring 53, and the container will be releasably locked on the disk 46.

When it is desired to clean pipe systems such as that shown in Figure 1, a cleaning chemical such as sodium carbonate is placed into the container 40; the valves 14, 26, and 29' are closed, and the valves 22, 19, 24, and 28 are opened. The valves 32 and 33 may be both opened if a mixture of hot and cold water is desired, or either alone may be opened if either hot or cold water is desired. The inlet water then passes through the pipe 29, valve 28, and inlet tube 40, which is so constructed that the water emerging from the tip of the tube forms a spray in the container 40. This spray thoroughly diffuses the solid chemical contained therein, causing the latter to dissolve and emerge through the perforations of the wall 41 in the form of a solution into the mixing chamber 25. This solution rises and passes from the mixing chamber through the pipe 23, into the pipe 13 above the valve 14, through the coil 18, and out through the tap 19. After the water has flowed a sufficiently long time to enable the pipe 13 to be thoroughly cleaned, the valves 24 and 28 are shut and valve 29' is opened, thus enabling the fresh water to circulate through the pipe 13 until all of the cleaning solution has been removed therefrom. When, in the course of repeated operations of the kind above-described, the chemical container has become more or less clogged, the latter is cleaned by first removing the cap 34 from the cylinder 36, and then lifting the container 40 out of the mixing cylinder to a place where it may be conveniently dismounted and thoroughly cleaned. After cleaning, the container is re-inserted into the mixing cylinder as above-described. Usually a battery of barrels 10 is used in such a pipe system and when such is the case, the air line 11 and the pipe 23 are extended and connected to each of the barrels in the same manner as shown in Figure 1.

Obvious modifications in form and structure may be made without departing from the spirit of the invention.

We claim:

1. In an apparatus for cleaning beer pipes or the like, a mixing cylinder adapted to be connected between the water supply and the beer pipes comprising a cylindrical wall closed at both ends and forming a hollow chamber therein, an inlet pipe connected to the said water supply extending through the bottom of said cylinder into said chamber, a chemical container substantially cylindrical in form mounted on said inlet pipe and having the latter extending into said container, the walls of said container having yielding perforations therein, said container being releasably mounted on said inlet pipe, and means partly on said inlet pipe and partly on said container for releasably interlocking said container with said inlet pipe.

2. In an apparatus of the class described, a mixing cylinder comprising a cylindrical wall closed at the top and bottom to form a chamber therein, an inlet pipe extending through the bottom of said cylinder into said chamber, a second smaller cylinder mounted in said chamber and having said inlet pipe extending thereinto, the walls of said smaller cylinder being perforated, a removable cap on said smaller cylinder, a disk concentrically and rigidly mounted on said inlet pipe, and means partly on said disk and partly on the bottom of said smaller cylinder for releasably interlocking said smaller cylinder on said disk.

3. In an apparatus of the class described, a mixing cylinder comprising a cylindrical wall closed at the top and bottom to form a chamber therein, an inlet pipe extending through the bottom of said cylinder into said chamber, a second smaller cylinder mounted in said chamber and having said inlet pipe extending thereinto, the walls of said smaller cylinder being perforated, a removable cap on said smaller cylinder, a disk concentrically and rigidly mounted on said inlet pipe, and means partly on said disk and partly on the bottom of said smaller cylinder for releasably interlocking said smaller cylinder on said disk, said means comprising a pair of divergent arms hingedly secured in said disk, resilient means normally urging said arms apart, the ends of said arms being cup-shaped and having their concave surfaces facing each other, means for limiting the spreading movement of said arms, the bottom of said container having a recess, the lower portion of said recess being tapered and the upper portion being substantially spherical, said arms being adapted to register in said recess to mutually interlock said disk with said container bottom.

4. In an apparatus of the class described, a mixing cylinder comprising a cylindrical wall closed at the top and bottom to form a chamber therein, an inlet pipe extending through the bottom of said cylinder into said chamber, a second smaller cylinder mounted in said chamber and having said inlet pipe extending thereinto, the walls of said smaller cylinder being perforated, a removable cap on said smaller cylinder, a disk concentrically and rigidly mounted on said inlet pipe, and means for releasably interlocking said smaller cylinder on said disk comprising yieldably compressible members extending from said disk, the bottom of said container having recesses, said compressible members being adapted to register in said recesses.

5. In an apparatus of the class described, a mixing cylinder comprising a cylindrical wall closed at the top and bottom to form a chamber therein, an inlet pipe extending through the bottom of said cylinder into said chamber, a second smaller cylinder mounted in said chamber and having said inlet pipe extending thereinto, the walls of said smaller cylinder being perforated, a removable cap on said smaller cylinder, a disk concentrically and rigidly mounted on said inlet pipe, and means for releasably interlocking said smaller cylinder on said disk comprising yieldably compressible members extending at right angles from said disk, the bottom of said container having recesses, said compressible members being adapted to register in said recesses.

FRANK BURKETT.
ELLIS TAYLOR.